United States Patent [19]
Navarre et al.

[11] Patent Number: 5,984,110
[45] Date of Patent: Nov. 16, 1999

[54] DEVICE FOR PURIFYING LIGHTLY LADEN WATER

[75] Inventors: Francois-Pierre Navarre, Charbonniere Les Bains; Bernard Bossand, Communay; Pierre Girard, Saint Ismier; Joseph Dussaud, Pont-Eveque, all of France

[73] Assignees: Elf Antar France, Courbevoie; Ahlstrom, Vitry Sur Seine Cedex, both of France

[21] Appl. No.: 08/988,067

[22] Filed: Dec. 10, 1997

[30] Foreign Application Priority Data

Dec. 12, 1996 [FR] France ................................. 96-15293

[51] Int. Cl.⁶ ................................................. B01D 24/00
[52] U.S. Cl. .......................... 210/504; 210/506; 210/509; 210/491
[58] Field of Search ..................... 210/503, 504, 210/505, 506, 508, 509, 491, 492, 387; 162/142, 147, 150

[56] References Cited

U.S. PATENT DOCUMENTS

| | | | |
|---|---|---|---|
| 3,398,220 | 8/1968 | Port et al. | 264/DIG. 47 |
| 3,505,794 | 4/1970 | Nutter et al. | 55/498 |
| 3,573,158 | 3/1971 | Pall et al. | 162/145 |
| 3,791,527 | 2/1974 | Ball et al. | 210/387 |
| 3,888,766 | 6/1975 | De Young | 210/36 |
| 4,025,438 | 5/1977 | Gelman et al. | 210/503 |
| 4,032,457 | 6/1977 | Matchett | 210/489 |
| 5,308,508 | 5/1994 | Womack | 210/767 |

FOREIGN PATENT DOCUMENTS

| | | | |
|---|---|---|---|
| 2 199 479 | 4/1974 | France . | |
| 52-12462 | 7/1974 | Japan | 210/509 |
| 59-173113 | 3/1983 | Japan | 210/503 |
| 62-155914 | 12/1985 | Japan | 210/508 |
| 2-59099 | 8/1988 | Japan | 210/506 |
| 2-075313 | 9/1988 | Japan | 210/509 |
| 975048 | 12/1973 | U.S.S.R. | 210/503 |
| 2 043 734 | 10/1980 | United Kingdom . | |
| WO 95/18265 | 7/1995 | WIPO . | |

OTHER PUBLICATIONS

Patent Abstracts of Japan, vol. 097, No. 010, JP 08 266 846, Oct. 15, 1996.
Patent Abstracts of Japan, vol. 010, No. 148, May 29, 1996, JP 61 008 102, Jan. 14, 1986.

Primary Examiner—Jay H. Woo
Assistant Examiner—Frank M. Lawrence
Attorney, Agent, or Firm—Oblon, Spivak, McClelland, Maier & Neustadt, P.C.

[57] ABSTRACT

The subject matter of the present invention is a device for purifying lightly laden water containing particles and/or fatty matter and/or microorganisms in suspension. The device of the invention is a filter comprising a grid (1) on which is placed a filter element (3) consisting of at least one sheet based on fibers and filled with organic and/or inorganic powders. The invention finds its application in all the industries which consume water and especially the crude oil processing industries and the chemical, papermaking and agri-foodstuffs industries.

16 Claims, 2 Drawing Sheets

DEVICE FOR PURIFYING LIGHTLY LADEN WATER

TECHNICAL FIELD

The present invention relates to a device for purifying lightly laden waters containing inorganic particles and/or organic matter and/or hydrocarbons and/or microorganisms in suspension.

It finds its application in all the industries which consume water and especially the industries for production and processing of crude oil and the chemical, petrochemical, papermaking and agri-foodstuffs industries.

It also finds its application for the purification of the waters of rivers, of lagoons, of groundwater and of seawater.

STATE OF THE PRIOR ART

A filtering device is described in U.S. Pat. No. 3,791,527. This device comprises a filter with a perforated rotary drum placed in a storage vessel containing a suspension to be filtered, and a sheet of filter paper which is continually renewed and partially wound around the drum. In addition an endless plastic cloth is placed between this sheet and the surface of the perforated drum.

The inside of the drum is kept at reduced pressure, and this has the effect of drawing the liquid in through the perforations in the drum, the particles becoming deposited at the surface of the paper.

With this device the speed of flow of the liquid is low and the paper blocks very rapidly, and this results in a large area of paper being used to treat a given quantity of liquid to be filtered in a given time.

The paper has low mechanical strength, especially when wet, and this limits the possibilities of pulling to ensure its continuous unwinding in the filters with forward movement of the filter element.

Paper consisting essentially of natural or synthetic fibres has low absorption capacities and characteristics which are not adapted to the filtration of a wide range of suspensions.

DESCRIPTION OF THE INVENTION

The objective of the present invention is precisely to overcome these disadvantages and to provide a device for purifying especially waters that are lightly laden containing in suspension inorganic particles and/or organic matter and/ or hydrocarbons and/or microorganisms, for example viruses, microbes, bacteria, algae, yeasts and plankton.

In general the device of the invention is particularly well suited for purifying waters containing less than 100 mg/liter in the water obtained after purification.

In addition, the speed of flow of the water in the device is high, the rate of blocking is low and the absorption capacities for organic liquid matter are very high.

The device of the invention finds its application especially in oil refineries and on oil production platforms for the purification of waste water with a view to its recycling, which involves the use of water of high purity, so as to protect the equipment against corrosion or abnormal wear.

In the case of oil production platforms the recycling of the groundwater requires a pure water quality in which the size limit of the matter in suspension does not exceed 2 microns. In the case of discharges into the natural environment the hydrocarbon content sought after is as low as possible.

Similar characteristics are required in most industries.

To this end the present invention provides a device for purifying lightly laden water containing in suspension inorganic particles and/or organic matter and/or hydrocarbons and/or microorganisms, and comprising a grid supporting a cloth on which a filter element is placed, means for placing lightly laden water in contact with the filter element in order that it should pass through the said filter element and means for receiving water after passing through the said filter element, characterized in that the said filter element consists of at least one sheet based on fibres and filled with organic and/or inorganic powders.

According to another characteristic of the invention the filter element consists of three superposed filter sheets, first, second and third respectively, the first one of which, in contact with the filter cloth, is filled with a powder which has a particle size of between 1 and 5 microns, the second with a powder which has a particle size of between 5 and 30 microns and the third with a powder which has a particle size of between 50 and 150 microns.

According to another characteristic of the invention at least one sheet based on fibres is filled with organic and/or inorganic powders which have a particle size of between 1 and 150 microns.

According to another characteristic of the invention the fibre-based sheet is made up of 50 to 70% of cellulose, of 10 to 20% of synthetic fibres and of at least one binder.

According to another characteristic of the invention the filter element additionally contains resins which improve its mechanical strength in the wet state.

According to another characteristic of the invention the filter element has previously undergone a treatment to make it oleophilic.

According to another characteristic of the invention the filter element has previously undergone a sulfinizing treatment to make it oil-repellent.

According to another characteristic of the invention the filter element has previously undergone a treatment to make it fire-resistant.

According to another characteristic of the invention the filter element has previously undergone a treatment with an acid which has been used in a hydrocarbon alkylation unit.

According to another characteristic of the invention the filter element additionally contains fibrils which improve its mechanical strength.

According to another characteristic of the invention the filter element additionally contains at least one electrically conductive powder, to facilitate the elimination of static electricity charges.

BRIEF DESCRIPTION OF THE DRAWINGS

Other characteristics and advantages of the present invention will appear more clearly on reading the description given below with reference to the appended drawings in which.

DETAILED DESCRIPTION OF THE INVENTION

Among the waters that are recovered in factories which consume water or water treatment plants or in the natural environment there may be mentioned groundwater, process waters, waters originating from desalination, sewage from inhabited platforms, sea and lagoon water, storm-water basins, rainwater, waters from laden water courses, raw mains waters after screening, laden waters from biological ponds and pond effluents from water treatment plants, discharges from textile, papermaking, chemical and agri-foodstuffs industries (slaughterhouses, dairies, canning plants) and waters containing machining fluids.

All these waters have in common a low content of particles, some of which are of very small particle size of between 0.1 and 20 microns. The objective of the invention is to provide a water in which the suspended matter content is lower than 3 mg per liter, the diameter of the particles being smaller than 2 microns and in which the organic matter content is lower than 0.1 mg per liter in the case of flow rates of the order of 40,000 m$^3$ per day in a paper factory and of approximately 15,000 m$^3$ per day in an oil refinery.

In addition, these waters may contain matter which exhibits blocking properties and/or a semipasty consistency. This is the case, for example, with waters containing microorganisms such as plankton, yeasts and algae, which are between 1 and 100 microns in size.

These waters may also contain in suspension hydrocarbon micelles which are in the form of fine drops of 2 to 250 microns and especially of 10 to 50 microns. These drops may also contain water micelles.

Figure 2:
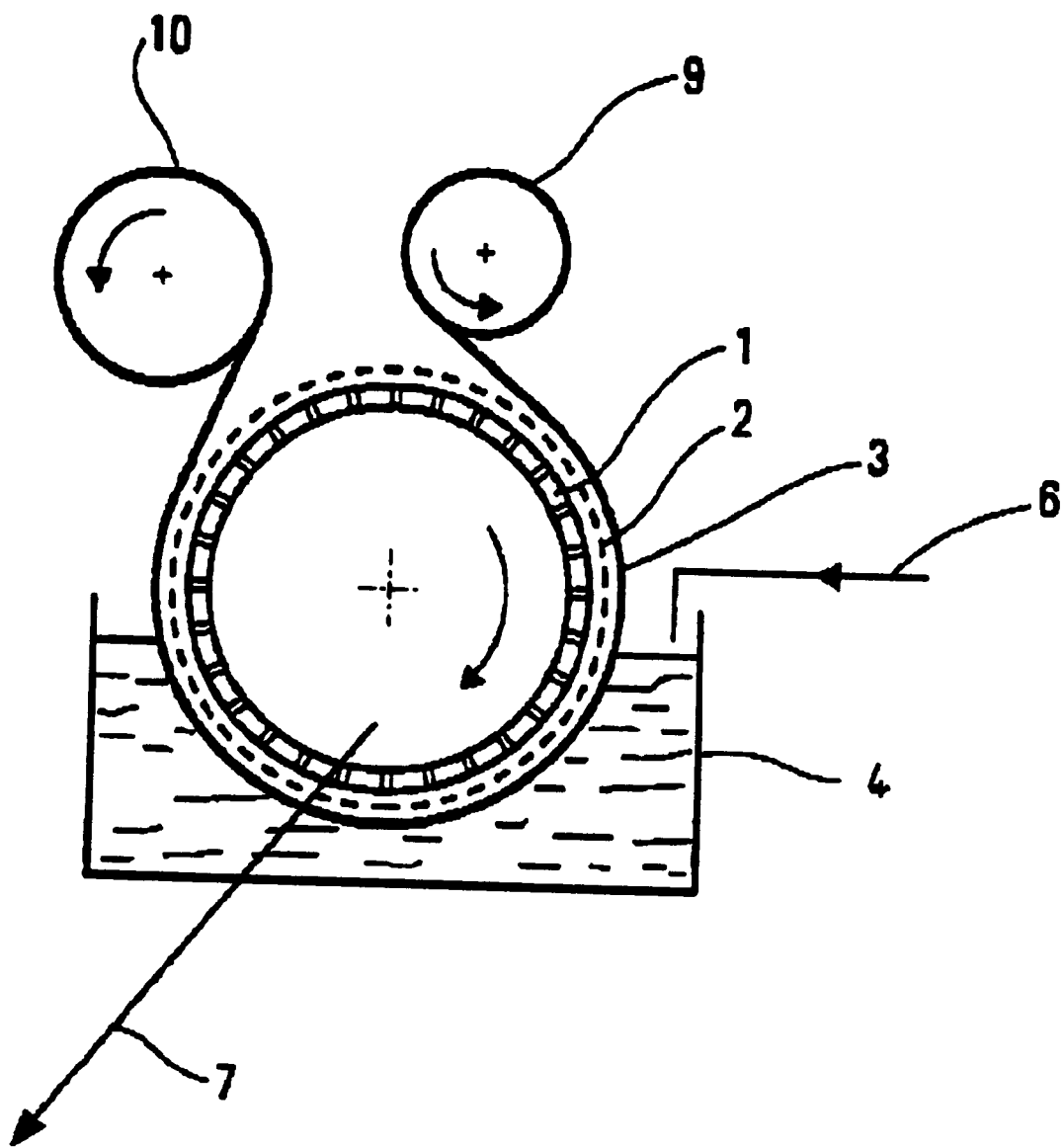
FIG. 2 shows diagrammatically a particular embodiment of the device of the invention, comprising a rotary drum.

To this end the device of the invention, according to the particular embodiment shown diagrammatically in FIG. 2, comprises:

a tank 4 containing a lightly laden water to be purified means 6 for feeding water to the tank 4 a rotary perforated drum 1 made of epoxy resin a cloth 2 made of polyester fibres covering the external wall of the drum 1 a filter element 3 consisting of a fibre-based sheet filled with organic and/or inorganic powder a roll 9 for feeding filter element 3 a roll 10 for recovering the filter element 3 laden with matter in suspension in the water to be purified means 7 for recovering water which has passed through the filter element 3.

The device can also comprise, not shown, means for applying vacuum to the internal part of the drum 1.

The lightly laden water containing in suspension inorganic particles, for example grains of silica, organic matter, for example animal and/or vegetable fats, hydrocarbons, microorganisms, for example plankton, bacteria, viruses, yeasts or algae, is delivered to the tank 4 by the feed means 6 which may comprise a device for controlling the water level in the tank 4.

Under the effect of a pressure difference between the interior of the drum 4 and the external face of the filter element 3, the water passes through the filter element on which the matter in suspension is retained and the purified water flows to the interior of the drum, from which it is removed by the means 7.

One of the main advantages of the invention is the ability to choose the cellulose or synthetic fibre and the filler powder that are best adapted to the matter in suspension in the water, which exhibits extremely diverse characteristics depending on the source of the water which contains it. This advantage of the invention will be appreciated better on reading the examples which are to follow.

Another advantage of the use of a fibre-based filter element 3 filled with organic and/or inorganic powder is the improvement in the characteristics of the filter element.

Figure 1:
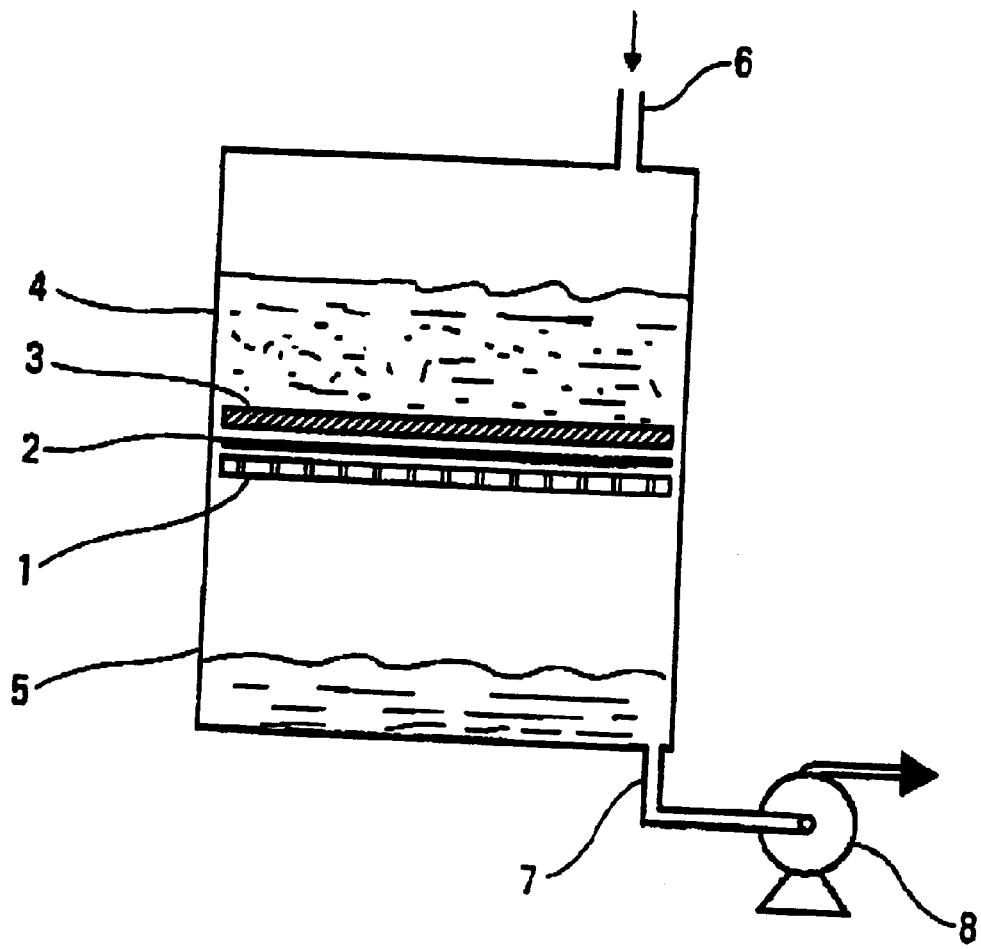
FIG. 1 shows diagrammatically a device for purifying lightly laden water.

FIG. 1 shows a device according to the present invention comprising a grid (1) which supports a cloth (2) on which a filter element (3) is placed, means (4) for placing lightly laden water in contact with the filter element (3) in order that it should pass through the said filter element (3) and means (5) for receiving water after passing through the said filter element (3), characterized in that the said filter element (3) consists of at least one sheet of paper filled with organic and/or inorganic powders. FIG. 1 also shows a pump (8) for removing water through means (7).

A table of comparison of the characteristics of sheets of papers filled with vegetable matter with those of an unfilled paper manufactured from recovered fibres will be found below by way of nonlimiting example.

|  | Units | Test reference | | |
| --- | --- | --- | --- | --- |
|  |  | Variant 1 100% WP | Variant 2 80% WP 20% VF 150 | Variant 3 60% WP 40% VF 150 |
| Weight per unit area | g/m$^2$ | 267 | 276 | 277 |
| Thickness | μm | 373 | 481 | 528 |
| Handle (bulk) | μm$^3$/g | 1.4 | 1.7 | 1.9 |
| Δ/V1 |  |  | +21.5% | +35.5% |
| Water drop absorption (time) | s | 9 | 3.5 | 2 |
| Δ/V1 |  |  | −60% | −77% |
| Breaking length | m | 5535 | 2365 | 1105 |
| Δ/V1 |  |  | −57% | −80% |
| Dry burst strength | kPa m$^2$/g | 4.83 | 1.71 | 0.69 |
| Δ/V1 |  |  | −65% | −86% |
| Wet burst strength | kPa m$^2$/g | 2.64 | 2.40 | 0.35 |
| Δ/V1 |  |  | −50% | −87% |
| Wet/dry ratio | % | 54.5 | 52 | 51 |
| Water flow hydraulic capacity |  |  |  |  |
| at 25° C. at 600 mmHg | m$^3$/m$^2$/h | 0.9 | 5.6 | 7 |
| at 50° C. at 600 mmHg | m$^3$/m$^2$/h | 0.9 | 7 | 9.3 |

WP means waste paper

VF 150 means vegetable filler of particle size smaller than 150 μm

V1 means variant 1

Δ means difference

The fact of obtaining such characteristics of the filter element which is manufactured from cheap materials such as recovered paper and a vegetable filler makes the device of the invention particularly economical.

As can be seen in the table above, the weight per unit area of the paper is not affected by the addition of vegetable powder. The bulk of the filled paper, defined by the ratio of the thickness to the weight per unit area is higher than that of the unfilled paper. The reduction in the value of the parameter which characterizes the water drop absorption shows that the organic powder filler makes the paper hydrophilic. The breaking length and the burst strength fall with the increase in the organic powder filler, while retaining acceptable values for the envisaged applications. The hydraulic capacity, which characterizes the rate of flow of the filtrate through the paper, is very greatly increased by the addition of organic powder. In the case of the paper filled with 40% of vegetable powder the hydraulic capacity is ten times greater than that obtained with the unfilled paper. Such a remarkable result was unexpected.

The mechanical strength of the filter element can be improved by incorporating into it resins based, for example, on urea-formalin, melamine formalin or on epichlorohydrin. All the advantage of this characteristic is found in the devices in which the filter element is subjected to a high mechanical tension to ensure its continuous forward movement.

By virtue of the device of the invention the characteristics of the filter element can be adapted to make it more or less oleophilic and/or hydrophilic and/or fire-resistant by subjecting it to an appropriate treatment.

For example, a treatment with acid makes the filter element oil-repellant, that is to say resistant to water and not very porous.

This characteristic is improved further if an acid which has been used in a hydrocarbon alkylation unit is employed, by virtue of the hydrocarbons associated with the actual acid, which are adsorbed by the powders and the fibres.

According to another characteristic of the device the filter element contains, in addition to the fibres and the powders, fibrils which have the effect of improving its flexibility and its compressibility so that the filter element stands up better to the changes in pressure and flow rate of the water to be purified.

The respective proportions of the fibres, powders and fibrils are chosen experimentally to obtain the characteristics best adapted to the water to be purified.

According to another characteristic of the device of the invention the filter element contains an electrically conductive powder, for example a conductive metal salt, which makes it possible to eliminate the static electricity which is formed by friction during its handling operations, especially in devices where the filter element is in the form of rolls.

This safety aspect is particularly sought after in industries in which sparks can cause explosions as a result of the presence of flammable products in the atmosphere. This is the case with waters laden with hydrocarbons.

The elimination of the static electricity charges also makes it easier to unwind the rolls of filter element.

The use of a filter element filled with conductive powder avoids the installation of means for eliminating static electricity charges, such as, for example, conductive shoes and brushes, or the wetting of the filter element with water as it leaves the reel and in all cases the powder is moistened before it is employed on the machine.

EXAMPLE 1

The device of the invention is intended for the purification of a lightly laden water which is final effluent from a paper factory.

After purification, the water obtained constitutes the load of a biological water treatment station.

The water to be purified exhibits the following characteristics:

slight nauseating odour grey colour relative density close to 1 viscosity at 40° C.: 10 centipoises solids content in suspension approximately 1 g per liter particle size 3 to 100 $\mu$m chemical oxygen demand: 270 mg/liter biological oxygen demand: 76 mg/liter The filter employed in this example is a filter with paper unwinding, including a conveyor grid, a roll of virgin filter element 90 cm in width, a reel for recovering the filter element laden with impurities, a vacuum pump and a pump for filtrate recovery. The water to be purified is introduced through the top part of this unit.

The filter element employed is a paper produced from waste paper and filled with a spruce powder. It includes 70% of recovered fibres and 30% of powder which has a particle size of between 10 and 150 $\mu$m; its characteristics are the following:

weight per unit area: 200 g/m$^2$ thickness: 500 $\mu$m breaking length: 1800 m dry burst strength: 1.2 kPa m$^2$/g The particles of cellulose and inorganic matter in suspension in the water to be purified are bound onto the filled paper.

The layer thus formed remains porous. In this way up to 3 m$^3$ of water can be treated per hour and per m$^2$ of filled paper at a temperature of approximately 20° C.

The filtrate obtained is a colourless, clear and odourless water. The content of suspended matter determined by the method described in NFT standard 90202 is nil. The chemical oxygen demand is 120 mg/liter and the biological oxygen demand is 18 mg/liter.

The water obtained by virtue of the device of the invention is stable and exhibits all the qualities of a recyclable water.

In our example the paper factory annually produces 43,000 T of paper and requires the treatment of 1,290,000 m$^3$ of water per year.

The consumption of filled paper is 50 m$^2$/hour.

The quantity of matter in suspension is approximately 28,000 t/year.

The laden paper is recycled for the manufacture of cardboard or of a filled paper intended for water purification.

The electrical energy consumed is approximately 1 kW hour per cubic meter of purified water, hence the economic advantage of the device from the viewpoint of energy.

EXAMPLE 2

The water which has been used for the operation of crude oil treatment units must satisfy discharge standards. To do this, it is generally treated especially in biological tanks in which the objective is to reduce the biological loads which are characterized by their chemical oxygen demand (COD) and their biological oxygen demand (BOD). Despite this treatment, supplemented by a sedimentation operation, the water cannot be discharged directly into the natural environment. It must be diluted with other, less laden, effluents, but the quantity of discharged matter in suspension is always the same.

The device of the invention for treating this water comprises a belt filter operating under vacuum, with a filter element consisting of filled paper, the composition of which is the following:

recycled cellulose fibres: 60% weight the organic powder is spruce powder: 39% weight the additive is epichlorohydrin: 1% weight The particle size of the spruce powder is between 5 and 150 microns.

The characteristics of the paper are the following:

weight per unit area: 277 g/m$^2$ thickness: 528 $\mu$m bulk: 1.9 $\mu$m$^3$/g water drop absorption: 2 s breaking length: 1105 m dry burst strength: 0.69 kPa m$^2$/g wet burst strength: 0.35 kPa m$^2$/g hydraulic capacity at 25° C.: 7 m$^3$/m$^2$/h The filled paper unwinds and passes through several vacuum chambers becoming laden with matter in suspension and microcontaminants.

The filtrate is light, clear and odourless.

The table below shows the characteristics of the water to be purified, those of the water obtained by means of the device of the invention and the purification yields.

| Water characteristics | | | Purification |
|---|---|---|---|
| | before purification | after purification | yields in % |
| pH at 20° C. | | 6.8 | |
| Chemical oxygen demand | 147 mg/l | 107 mg/l | 27 |
| Biochemical oxygen demand* | 40 mg/l | 6 mg/l | 85 |
| Total matter in suspension | 64 mg/l | 4 mg/l | 93 |
| Total hydrocarbons | 0.94 mg/kg | <0.2 mg/kg | 78 |
| Phenol value after distillation | 0.026 mg/l | 0.017 mg/l | 34 |

*BOD over 5 days in mg/l is $O_2$

The rate of treatment is 7 $m^3$ of laden water per hour and per $m^2$ of filled paper.

It is found that the filled paper does not block and that the bacteria whose particle size ranges from 1 to 10 microns are retained on the filled paper without the rate of flow being appreciably altered.

The filtrate obtained with the device of the invention is a water which exhibits acceptable characteristics for being discharged into the natural environment.

The electricity usage is 0.8 kW hour per tonne of purified water.

480,000 t of purified water are recovered in the case of an annual loading of 513,000 t of water. The loss is therefore only 33,000 t.

We claim:

1. Device for purifying lightly laden water containing in suspension at least one of inorganic particles, organic matter, hydrocarbons, and microorganisms, comprising a grid which supports a cloth on which a filter element is placed, means for placing lightly laden water in contact with the filter element in order that it should pass through the said filter element and means for receiving water after passing through the said filter element, wherein said filter element consists of at least one sheet of paper filled with vegetable powders having a particle size of between 1 and 150 microns and obtained by incorporating the powders into the pulp of said paper during formation of said paper to form a filled paper, and wherein said filled paper has a ratio of thickness to weight per unit area of at least 1.7 $m^3/g$.

2. Device according to claim 1, wherein the filter element (3) consists of three superposed sheets of paper, first, second and third respectively, the first one of which, in contact with the filter cloth, is filled with a powder which has a particle size of between 1 and 5 microns, the second with a powder which has a particle size of between 5 and 30 microns and the third with a powder which has a particle size of between 50 and 150 microns.

3. Device according to claim 1, wherein the sheet of paper comprises 50 to 70% of cellulose fibres, and 10 to 20% of synthetic fibres by weight of unfilled paper.

4. Device according to claim 1, wherein the filter element additionally contains resins which improve its mechanical strength in the wet state.

5. Device according to claim 1, wherein the filter element has previously undergone a treatment to make it oleophilic.

6. Device according to claim 1, wherein the filter element has previously undergone a sulfurizing treatment to make it oil-repellent.

7. Device according to claim 1, wherein the filter element has previously undergone a treatment to make it fire-resistant.

8. Device according to claim 1, wherein the filter element has previously undergone a treatment with an acid which has been used in a hydrocarbon alkylation unit.

9. Device according to claim 1, wherein the filter element additionally contains fibrils which improve its mechanical strength.

10. Device according to claim 1, wherein the filter element additionally contains at least one electrically conductive powder, to facilitate the elimination of static electricity charges.

11. Device according to claim 1, wherein the filled paper contains said powder in an amount of at least 20% by weight of the filled paper.

12. Device according to claim 1, wherein the filled paper contains said powder in an amount of at least 40% by weight of the filled paper.

13. Device according to claim 1, wherein the water flow hydraulic capacity at 25° C. and 600 mmHg is at least 5.6 $m^3/m^2/h$.

14. Device according to claim 1, wherein the water flow hydraulic capacity at 25° C. and 600 mmHg is at least 7 $m^3/m^2/h$.

15. Device according to claim 1, wherein the water flow hydraulic capacity at 50 ° C. and 600 mmHg is at least 7 $m^3/m^2/h$.

16. Device according to claim 1, wherein the water flow hydraulic capacity at 50° C. and 600 mmHg is at least 9.3 $m^3/m^2/h$.

* * * * *